United States Patent
Lee et al.

(10) Patent No.: US 12,366,969 B2
(45) Date of Patent: Jul. 22, 2025

(54) STORAGE DEVICE INCLUDING MEMORY CONTROLLER AND OPERATING METHOD OF THE SAME

(71) Applicant: Samsung Electronics Co., Ltd., Suwon-si (KR)

(72) Inventors: Jinwook Lee, Seoul (KR); Heeseok Eun, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/982,951

(22) Filed: Nov. 8, 2022

(65) Prior Publication Data

US 2023/0205427 A1 Jun. 29, 2023

(30) Foreign Application Priority Data

Dec. 24, 2021 (KR) .................. 10-2021-0187770

(51) Int. Cl.
*G06F 3/06* (2006.01)

(52) U.S. Cl.
CPC .......... *G06F 3/0616* (2013.01); *G06F 3/0659* (2013.01); *G06F 3/0673* (2013.01)

(58) Field of Classification Search
CPC ..... G06F 3/0616; G06F 3/0659; G06F 3/0673
See application file for complete search history.

(56) References Cited

U.S. PATENT DOCUMENTS

| | | | |
|---|---|---|---|
| 10,216,423 B1 | 2/2019 | Malwankar et al. | |
| 10,338,842 B2 | 7/2019 | Martineau et al. | |
| 10,564,853 B2 | 2/2020 | Linkovsky et al. | |
| 10,739,996 B1* | 8/2020 | Ebsen ................. | G06F 16/1727 |
| 10,929,066 B1* | 2/2021 | Dalmatov ............. | G06F 3/0619 |
| 2008/0281885 A1* | 11/2008 | Dussud ............... | G06F 12/0276 |
| 2011/0022778 A1* | 1/2011 | Schibilla ............. | G06F 12/0246 |
| | | | 711/170 |
| 2012/0005405 A1* | 1/2012 | Wu ..................... | G06F 12/0246 |
| | | | 711/170 |
| 2017/0031631 A1* | 2/2017 | Lee ....................... | G06F 3/0679 |

(Continued)

FOREIGN PATENT DOCUMENTS

| | | |
|---|---|---|
| KR | 10-2019-0056211 A | 5/2019 |
| KR | 10-2021-0039185 A | 4/2021 |
| WO | WO-2021/015636 A1 | 1/2021 |

OTHER PUBLICATIONS

Extended European Search Report dated May 26, 2023 issued in corresponding European Appln. No. 22215378.5.

(Continued)

*Primary Examiner* — Ryan Bertram
(74) *Attorney, Agent, or Firm* — Harness, Dickey & Pierce, P.L.C.

(57) ABSTRACT

Provided is an operating method of a storage device including a memory controller and a memory device, the operating method including storing a plurality of streams received from a host in the memory device; performing a management operation on a first storage region of the memory device in which a first stream from among the plurality of streams is stored; and performing a management operation on a second storage region of the memory device in which a second stream selected from among the plurality of streams based on an attribute of the first stream is stored.

19 Claims, 15 Drawing Sheets

(56) References Cited

U.S. PATENT DOCUMENTS

| | | | |
|---|---|---|---|
| 2017/0075832 A1* | 3/2017 | Bhimani | G06F 16/2322 |
| 2018/0260154 A1* | 9/2018 | Dronamraju | G06F 3/068 |
| 2018/0276118 A1* | 9/2018 | Yanagida | G06F 12/0246 |
| 2018/0307596 A1* | 10/2018 | Pandurangan | G06F 3/0652 |
| 2018/0307598 A1* | 10/2018 | Fischer | G06F 3/0643 |
| 2019/0018784 A1* | 1/2019 | Ishii | G06F 12/10 |
| 2019/0146679 A1* | 5/2019 | Doh | G06F 3/0659 |
| | | | 711/103 |
| 2019/0303038 A1* | 10/2019 | Hubbard | G06F 3/0649 |
| 2020/0012444 A1* | 1/2020 | Ko | G06F 3/0679 |
| 2020/0110697 A1 | 4/2020 | Wu et al. | |
| 2020/0133668 A1* | 4/2020 | Chen | G06F 16/273 |
| 2020/0167274 A1 | 5/2020 | Bahirat et al. | |
| 2020/0201570 A1 | 6/2020 | Kim et al. | |
| 2020/0293443 A1* | 9/2020 | Pandurangan | G06F 3/0679 |
| 2021/0019255 A1* | 1/2021 | Akin | G06F 12/0246 |
| 2021/0064290 A1 | 3/2021 | Kanno | |
| 2021/0132827 A1 | 5/2021 | Helmick et al. | |
| 2021/0397550 A1 | 12/2021 | Byun et al. | |
| 2022/0197508 A1* | 6/2022 | Kanteti | G06F 3/0631 |

OTHER PUBLICATIONS

Korean Office Action dated Jul. 26, 2024 for corresponding Korean Application No. 10-2021-0187770.

\* cited by examiner

| SUB GROUP TABLE 1 | | | |
|---|---|---|---|
| HOST ID | STREAM ID1 | STREAM ID2 | ADDRESS |
| HOST 1 | Stream 0 | STR_A | BLK1 |
| HOST 2 | Stream 0 | | BLK4 |
| HOST 2 | Stream 1 | | BLK5 |
| HOST 3 | Stream 2 | | BLK9 |

STORAGE DEVICE INCLUDING MEMORY CONTROLLER AND OPERATING METHOD OF THE SAME

CROSS-REFERENCE TO RELATED APPLICATION

This application is based on and claims priority under 35 U.S.C. § 119 to Korean Patent Application No. 10-2021-0187770, filed on Dec. 24, 2021, in the Korean Intellectual Property Office, the disclosure of which is incorporated by reference herein in its entirety.

BACKGROUND

The inventive concepts relate to a storage device, and more particularly, to a storage device for grouping a plurality of streams based on stream attributes and an operating method of the same.

A plurality of hosts may share one storage device or one namespace. Alternatively, a plurality of hosts may share a plurality of storage devices or a plurality of namespaces.

Also, each host may transmit a stream to which a stream identifier is allocated to a storage device or a namespace, thereby controlling the stream to be stored in a storage region corresponding to the stream identifier.

A stream identifier may be allocated to related data having similar lifetimes, but specific criteria for allocating a stream identifier may differ from one host to another.

SUMMARY

The inventive concepts provide a storage device with improved lifetime by scheduling a management operation on streams having the same or consecutive attributes and an operating method of the storage device.

According to an aspect of the inventive concepts, there is provided a method of operating a storage device including a memory controller and a memory device, the method including storing a plurality of streams received from a host in the memory device; performing a management operation on a first storage region of the memory device in which a first stream from among the plurality of streams is stored; and performing a management operation on a second storage region of the memory device in which a second stream selected based on an attribute of the first stream from among the plurality of streams is stored.

According to another aspect of the inventive concepts, there is provided a method of operating a memory controller, the method including storing a plurality of streams received from a first host and a second host in a first storage node and a second storage node, respectively; grouping the streams into a plurality of subgroups based on attributes of the plurality of streams; controlling a management operation on a first storage region of the first storage node in which a first stream from among the plurality of streams is stored; and controlling a management operation of a second storage region of the second storage node in which a second stream included in the same subgroup as the first stream from among the plurality of subgroups is stored.

According to another aspect of the inventive concepts, there is provided a storage device including a memory device including a first storage region and a second storage region; and a memory controller configured to store a plurality of streams received from a host in the memory device, control the memory device to perform a management operation on the first region in which a first stream among the plurality of streams is stored, and control the memory device to perform a management operation on the second storage region in which a second stream selected based on attributes of the first stream from among the plurality of streams is stored.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
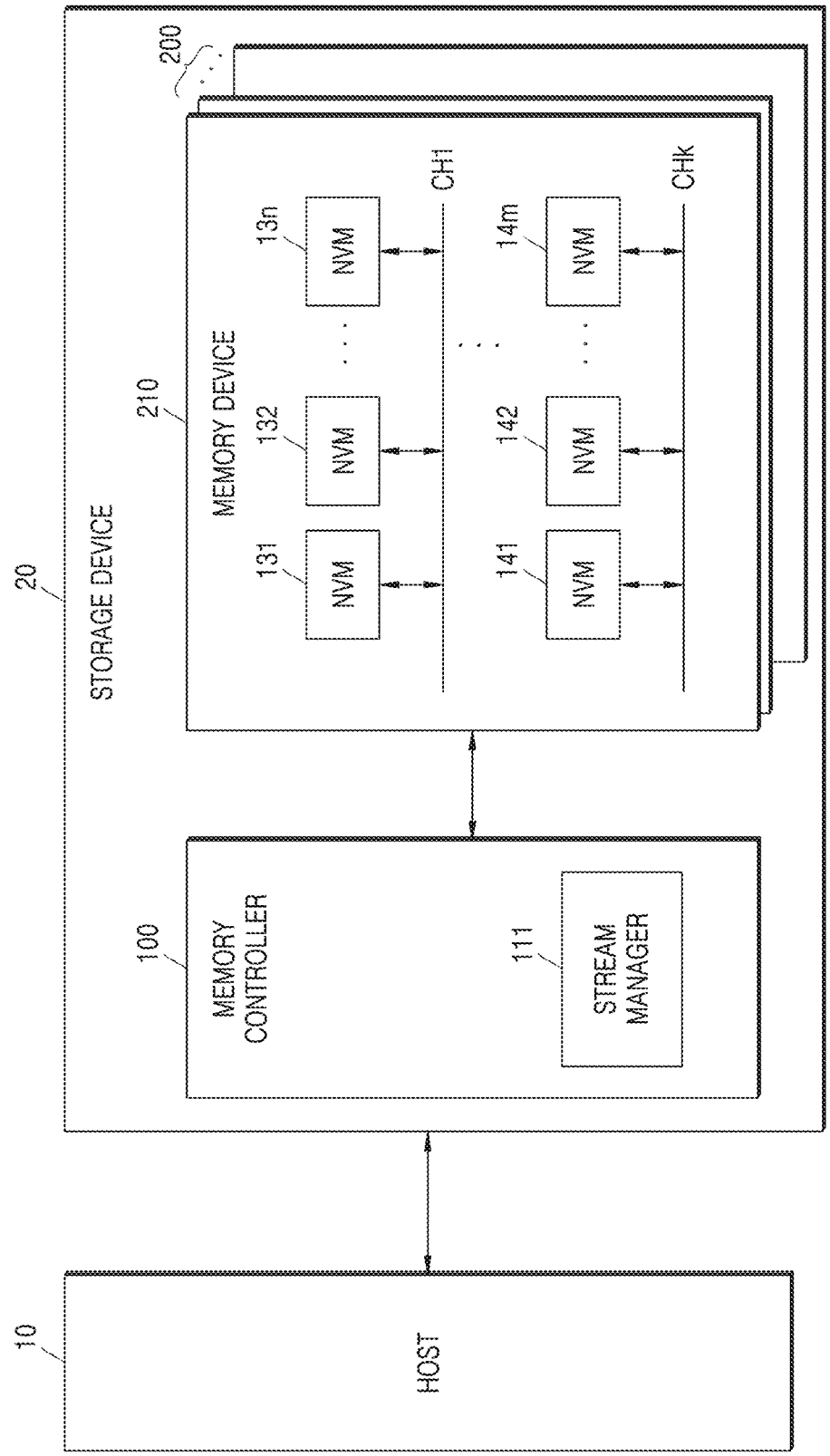
FIG. 1 is a diagram for describing a storage system according to example embodiments of the inventive concepts.

FIG. 1 is a diagram for describing a storage system according to example embodiments of the inventive concepts.

Referring to FIG. 1, a storage system 1 may include a host 10 and/or a storage device 20, and the storage device 20 may include a memory controller 100 and/or a plurality of memory devices 200. In response to a write/read request from the host 10, the memory controller 100 may control at least one of the memory devices 200, e.g., a memory device 210, to read data stored therein or write data to the memory device 210. Hereinafter, the descriptions regarding the memory device 210 may also be applied to each of the memory devices 200.

The storage device 20 may support a namespace function. Here, the "namespace" may be defined as a quantity of the memory devices 200 that may be formatted into logical blocks, and the namespace of size n is a collection of logical blocks having logical block addresses (LBA) from 0 to (n−1). The "namespace function" refers to the function of providing a plurality of logical devices from one physical device. For example, the namespace function may be a technique of dividing the storage device 20 into a plurality of namespaces and allocating a unique LBA to each namespace. The storage device 20 may include storage media for storing data according to requests from the host 10. As an example, the storage device 20 may include at least one of a solid state drive (SSD), an embedded memory, and/or a removable external memory. When the storage device 20 is an SSD, the storage device 20 may be a device complying with the non-volatile memory express (NVMe) standard. When the storage device 20 is an embedded memory or an external memory, the storage device 20 may be a device complying with the universal flash storage (UFS) standard or the embedded multi-media card (eMMC) standard. The host 10 and the storage device 20 may generate and transmit packets according to standard protocols employed thereby, respectively. When non-volatile memories 131 to 13n and 141 to 14m of the storage device 20 include flash memories, the flash memories may include a 2D NAND memory array or a 3D (or vertical) NAND (VNAND) memory array. In another example, the storage device 20 may include various other types of non-volatile memories. For example, the storage device 20 may include a magnetic RAM (MRAM), a spin-transfer torque MRAM, a conductive bridging RAM (CBRAM), a ferroelectric RAM (FeRAM), a phase RAM (PRAM), a resistive RAM, and various other types of memories.

The memory device 210 may include a plurality of non-volatile memories 131 to 13n and 141 to 14m. Non-volatile memories 131 to 13n may be connected to the memory controller 100 through a first channel CH1, and non-volatile memories 141 to 14m may be connected to the memory controller 100 through a second channel CH2. The namespace may provide logical blocks respectively corresponding to physical blocks included in at least one of the non-volatile memories 131 to 13n and 141 to 14m. In some example embodiments, the namespace may provide logical blocks corresponding to physical blocks, respectively, included in at least one of the memory devices 200.

The storage device 20 may support a stream function. Here, the "stream" may be defined as related data stored at a related location. The host 10 may control related data to be stored at a related location by allocating a stream identifier to the related data and providing the stream identifier to the storage device 20. Since related data having the same stream identifier may have similar lifetimes, the related data may be deleted from a non-volatile memory at similar timings. In other words, when streams having similar lifetimes are distributed in a plurality of logical blocks or a plurality of physical blocks and arbitrarily managed, a write amplification factor (WAF) may increase when the streams are updated. Therefore, the lifetime of the storage device 20 may be increased as the storage device 20 stores streams having similar lifetimes in the same logical block or the same physical block. A method by which the storage device 20 using a plurality of stream identifiers stores data may be described in detail later with reference to FIGS. 6A to 7.

The memory controller 100 may include a stream manager 111. The stream manager 111 may be hardware or may be firmware or software executed in the memory controller 100. The stream manager 111 may group a plurality of streams received from the host 10 into a plurality of subgroups based on attributes of the plurality of streams. For convenience of explanation, only one host 10 is shown in FIG. 1. However, the storage system 1 may include a plurality of hosts (as shown, for example, in FIG. 10). The storage device 20 may receive streams having different stream identifiers from a plurality of hosts. The hosts may each generate a stream identifier by using a unique algorithm, but the hosts may not be able to recognize algorithms used by one another. Therefore, streams generated by different hosts but having the same attribute or consecutive attributes may be managed individually. Therefore, the stream manager 111 may group streams having similar attributes from among streams received from a plurality of hosts into one subgroup. The memory controller 100 may improve stream management performance of the storage device 20 by scheduling a management operation on streams included in a subgroup.

The stream manager 111 may monitor attributes of streams stored in the memory devices 200. In some example embodiments, an attribute of a stream may be an access frequency to the stream, a time until the stream is invalidated after being written to the memory devices 200 (e.g., the lifetime of the stream), continuity of a logical addresses allocated to the stream, or a stream identifier.

The stream manager 111 may group a plurality of streams into a plurality of subgroups based on attributes of the streams. According to some example embodiments, the stream manager 111 may group streams having the same access frequency of the host 10 into one subgroup. According to some example embodiments, the stream manager 111 may group streams having the same lifetime into one subgroup. According to some example embodiments, the stream manager 111 may group streams having consecutively allocated logical addresses into one subgroup. According to some example embodiments, the stream manager 111 may group streams having stream identifiers adjacent to one another into one subgroup.

The memory controller 100 may schedule a management operation on streams included in the same subgroup. The management operation may be performed by a flash translation layer (FTL) executed in the memory controller 100. The management operation may refer to a garbage collection operation on the memory devices 200, a wear leveling operation on the memory devices 200, or an operation of adjusting the level of an operating voltage used in internal operations of the memory devices 200. The garbage collection operation may be described in detail later with reference to FIG. 5A, the wear leveling operation may be described in detail later with reference to FIG. 5B, and the operation of adjusting the level of an operating voltage may be described in detail later with reference to FIG. 3.

Figure 2:
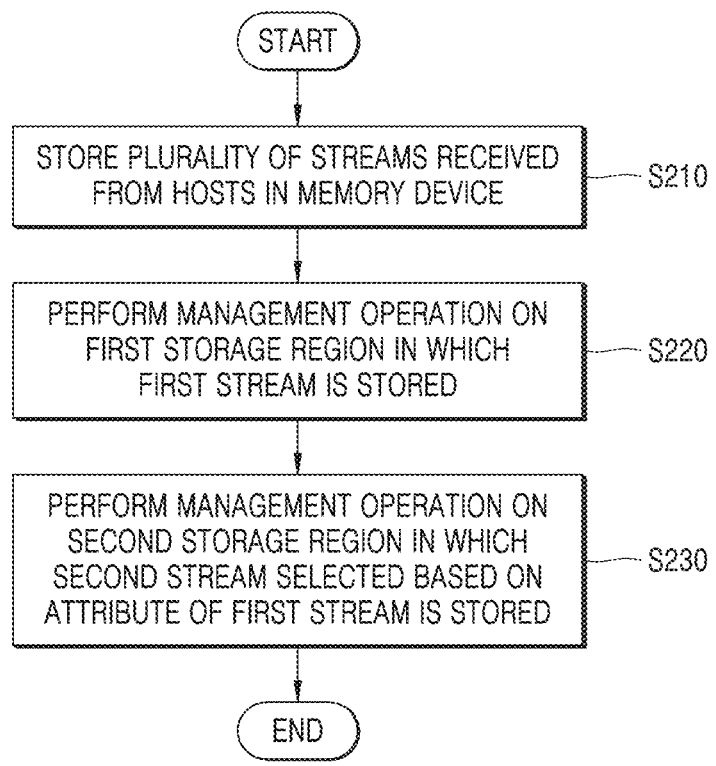
FIG. 2 is a flowchart of an operating method of a storage device, according to example embodiments of the inventive concepts.

FIG. 2 is a flowchart of a method of operating a storage device, according to example embodiments of the inventive concepts.

Referring to FIG. 2, a method of operating a storage device may include a plurality of operations S210 to S230. FIG. 2 may be described below with reference to FIG. 1.

In operation S210, the storage device 20 may store a plurality of streams received from the host 10 in the memory devices 200. The streams may be stored in different non-volatile memories or may be stored in a plurality of physical blocks included in one non-volatile memory. Although FIG. 1 shows only one host, the storage device 20 may receive streams from a plurality of hosts.

In operation S220, the storage device 20 may perform a management operation on a first storage region in which a first stream is stored from among a plurality of storage regions of the memory devices 200. A storage region may refer to a page, a block, a plane, a bank, or a namespace. The management operation may refer to a garbage collection operation on the storage region, a wear leveling operation on the storage region, or an operation of adjusting the level of an operating voltage used in an internal operation for the storage region. The management operation on the first storage region may be performed based on an erase count of the first storage region, a read count of the first storage region, the number of valid pages included in the first storage region, or correctability of data read from the first storage region. In some example embodiments, the first stream may be migrated to another storage region during the management operation on the first storage region.

In operation S230, the storage device 20 may perform a management operation on a second storage region in which a second stream is stored from among the storage regions of the memory devices 200. The storage device 20 may select the second stream based on the attribute of the first stream. An attribute of a stream may be an access frequency to the stream, a time until the stream is invalidated after being written to the memory devices 200 (e.g., the lifetime of the stream), continuity of a logical addresses allocated to the stream, or a stream identifier. For example, the storage device 20 may select a stream having the same access frequency as that of the first stream as the second stream. For example, the storage device 20 may select a stream having the same lifetime as that of the first stream as the second stream. For example, the storage device 20 may select a stream having a logical address consecutive to the logical address assigned to the first stream as the second stream. For example, the storage device 20 may select a stream having a stream identifier adjacent to the stream identifier of the first stream as the second stream. In some example embodiments, the first stream and the second stream may be streams received from different hosts. In some example embodiments, operation S230 may be performed in idle time during which the storage device 20 does not receive data from the host 10. In other words, the storage device 20 may perform operation S230 as a background operation (as may any other operation disclosed herein).

According to example embodiments of the inventive concepts, the lifetime of the storage device 20 may be increased by managing storage regions in which streams having the same attribute or consecutive attributes are stored.

Figure 3:
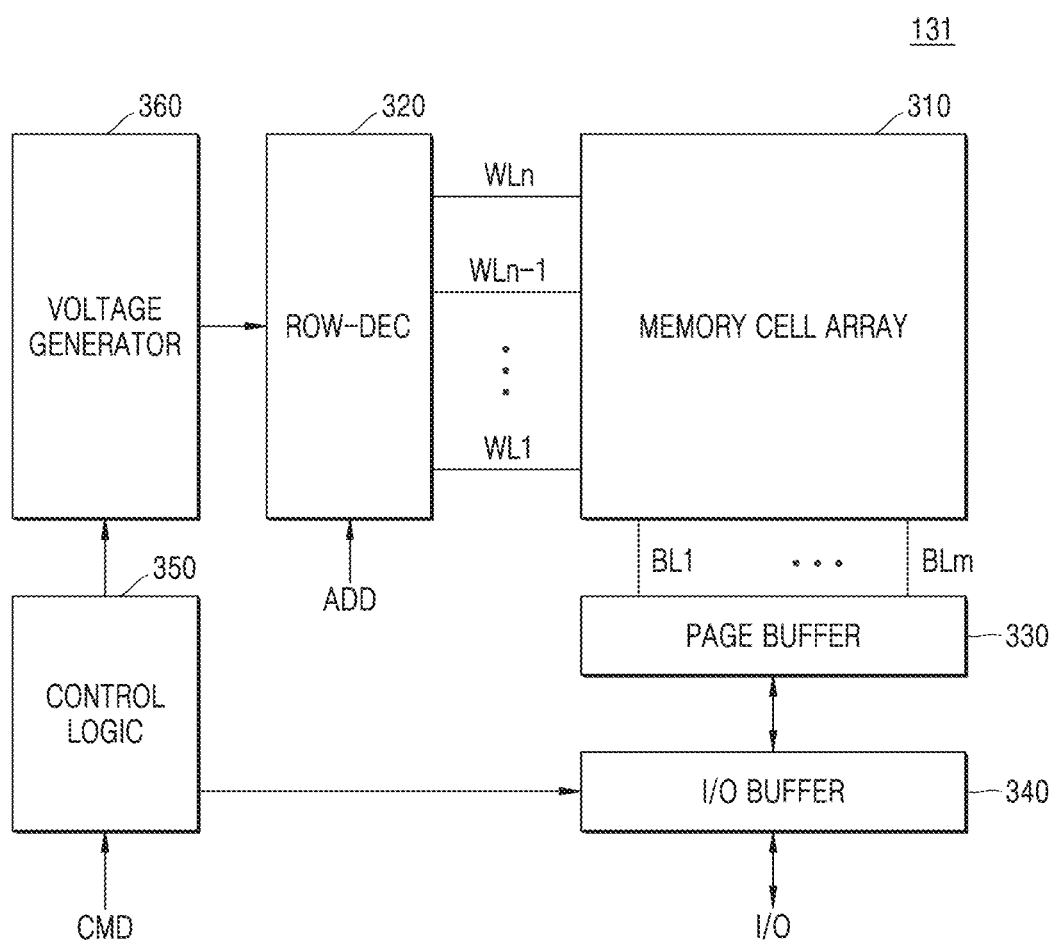
FIG. 3 is a block diagram showing a non-volatile memory device according to example embodiments of the inventive concepts.

FIG. 3 is a block diagram showing a non-volatile memory device 131 according to example embodiments of the inventive concepts. However, example embodiments are not limited thereto, and FIG. 3 may be a block diagram corresponding to any one of the non-volatile memories 131 to 13n and 141 to 14m.

The non-volatile memory device 131 may include a memory cell array 310, a row decoder 320, a page buffer 330, an input/output buffer 340, a control logic 350, and/or a voltage generator 360. According to example embodiments of the inventive concepts, the non-volatile memory device 131 may be a non-volatile memory including a flash memory device, an MRAM, a ReRAM, and an FRAM.

The memory cell array 310 may be connected to the row decoder 320 through word lines WL1 to WLn. Also, the memory cell array 310 may be connected to the page buffer 330 through bit lines BL0 to BLm. The page buffer 330 may operate as a write driver or a sense amplifier according to an operation mode. For example, during a program operation, the page buffer 330 may transfer a voltage corresponding to data to be programmed to the bit lines BL0 to BLm. Also, during a read operation, the page buffer 330 may sense data stored in a selected memory cell through the bit lines BL0 to BLm and transmit the data to the input/output buffer 340. The input/output buffer 340 may transmit received data to the page buffer 330 or output data provided from the page buffer 330 to the outside.

The control logic 350 may control various components included in the non-volatile memory device 131. For example, the control logic 350 may generate internal control signals according to a command CMD like program/read from the outside. For example, the control logic 350 controls the voltage generator 360 to generate operating voltages of various levels used for operations like programming and reading. Also, the control logic 350 may control timing for inputting and outputting data by controlling the input/output buffer 340.

The voltage generator 360 may generate various types of word line voltages to be respectively supplied to the word lines WL1 to WLn and a bulk voltage to be supplied to a bulk in which memory cells are formed (e.g., a well region) based on the control of the control logic 350. In example embodiments, a voltage generated by the voltage generator 360 may be referred to as an operating voltage. For example, in relation to a program operation, the voltage generator 360 may generate a program voltage provided to a selected word line, a pass voltage provided to an unselected word line, etc. Also, in relation to a read operation, the voltage generator 360 may generate a selected word line voltage and an unselected word line voltage having different levels. Also, the voltage generator 360 may provide a high-level erase voltage to the bulk in which a selected memory cell array is formed during an erase operation. The control logic 350 may control the voltage generator 360 to adjust the level of an operating voltage in response to the command CMD received from the memory controller 100 of FIG. 1.

The memory cell array 310 may include a plurality of cell blocks. According to example embodiments, the non-volatile memory device 131 may be a flash memory device, and the memory cell array 310 may include a plurality of NAND cell strings. Each of cell strings may form a channel in a vertical direction or a horizontal direction. Memory cells included in each of the cell strings may be programmed or erased by a high voltage provided from the row decoder 320.

Also, the memory cell array 310 may be connected to the row decoder 320 through other lines in addition to the word lines WL1 to WLn. For example, the row decoder 320 may be connected to the row decoder 320 through one or more string select lines SSL and a ground select line GSL.

Figure 4:
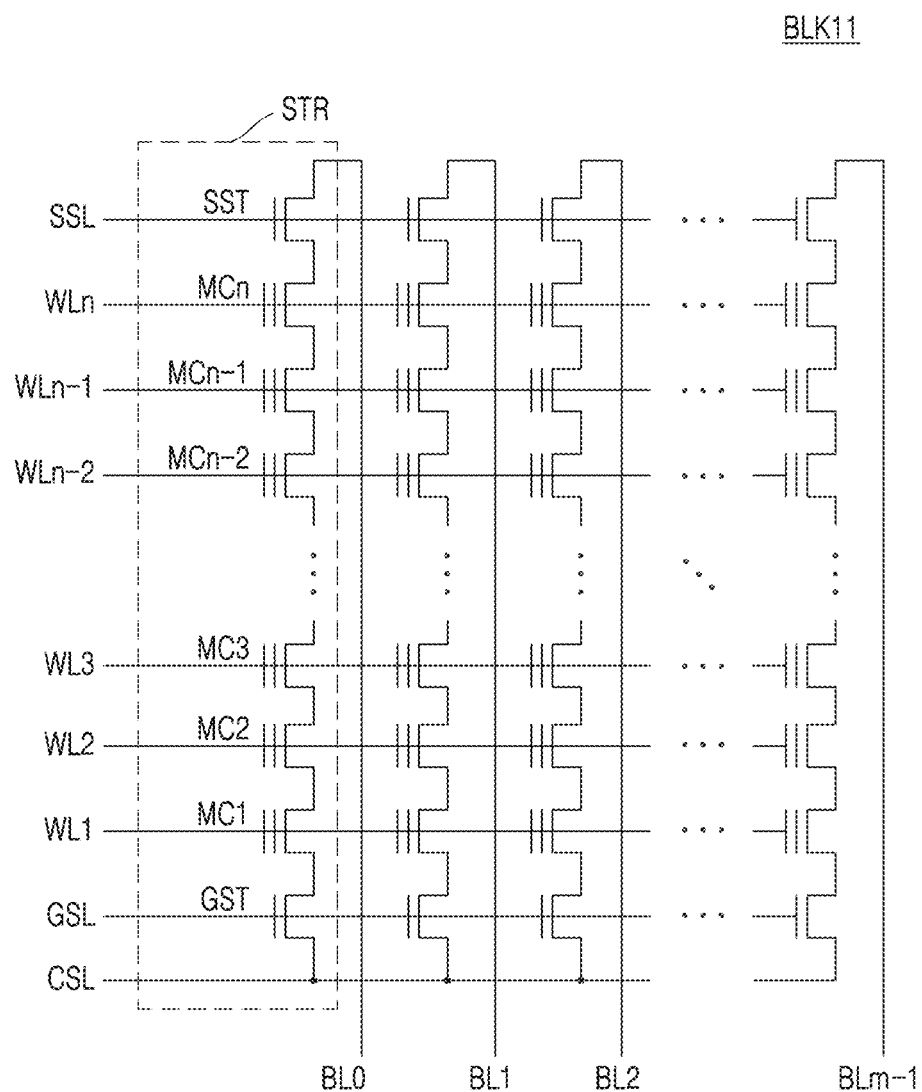
FIG. 4 is a circuit diagram showing a memory block according to example embodiments of the inventive concepts.

FIG. 4 is a circuit diagram showing a memory block according to example embodiments of the inventive concepts.

Referring to FIG. 4, a memory cell array (e.g., the memory cell array 310 of FIG. 3) may be a memory cell array of a horizontal NAND flash memories and may include a plurality of memory blocks. Each memory block BLK11 may include m (m is an integer equal to or greater than 2) cell strings STR to which a plurality of memory cells MC are connected in series in a direction toward bit lines BL0 to BLm−1.

In a NAND flash memory device having the structure as shown in FIG. 4, erasing may be performed block-by-block, and programming may be performed page-by-page, where pages correspond to word lines WL0-WLn−1, respectively. FIG. 4 shows an example in which n pages corresponding to n word lines WL1 to WLn−1 are provided in one block. Also, the non-volatile memory device 131 of FIG. 3 may include a plurality of memory cell arrays having the same structure and performing the same operation as the memory cell array 310 described above.

Figure 5A:
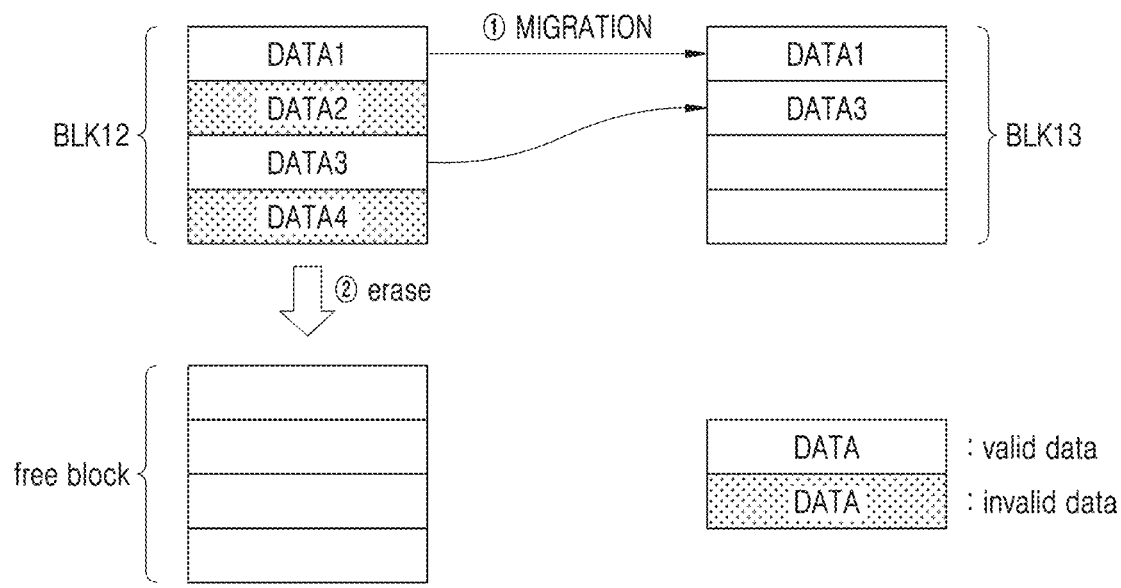
FIGS. 5A and 5B are diagrams for describing a management operation according to example embodiments of the inventive concepts.
Figure 5B:
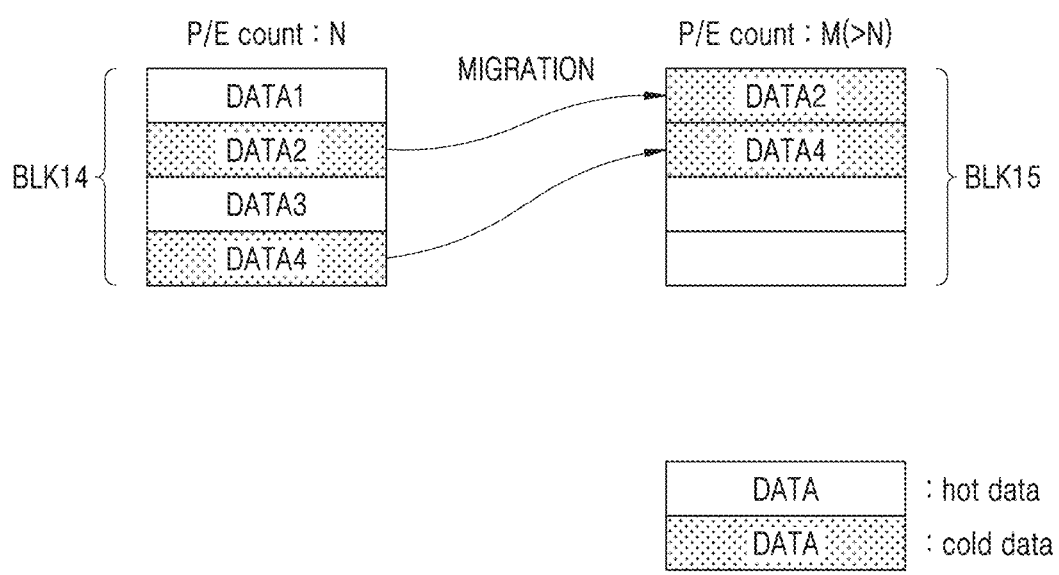

FIGS. 5A and 5B are diagrams for describing a management operation according to example embodiments of the inventive concepts. For example, FIG. 5A is a diagram for describing a garbage collection operation, and FIG. 5B is a diagram for describing a wear leveling operation. FIGS. 5A and 5B may be described below with reference to FIG. 1.

Referring to FIG. 5A, a memory block BLK12 may be an example of the memory block BLK11 shown in FIG. 4. First to fourth data DATA1 to DATA4 may be stored in the memory block BLK12. The first to fourth data DATA1 to DATA4 may each be data programmed in at least one page.

First and third data DATA1 and DATA3 may be valid data, and second and fourth data (DATA2 and DATA4) may be invalid data. During a garbage collection operation, a target memory block may be selected based on the number of valid pages programmed to a memory block. Valid data stored in the target memory block may be migrated to another memory block, and data stored in the target memory block may be erased. For example, as shown in FIG. 5A, the first and third data DATA1 and DATA3 that are valid data stored in the memory block BLK12 may be migrated to a memory block BLK13, and the memory block BLK12 may be erased and become a free block. Since it is necessary to migrate valid data to another memory block during a garbage collection operation, the WAF may increase.

Referring to FIG. 5B, a memory block BLK14 may be an example of the memory block BLK11 shown in FIG. 4. The first to fourth data DATA1 to DATA4 may be stored in the memory block BLK14. The first to fourth data DATA1 to DATA4 may each be data programmed in at least one page.

The first and third data DATA1 and DATA3 may be hot data with a high access frequency, and the second and fourth data DATA2 and DATA4 may be cold data with a low access frequency. During a wear leveling operation, a target memory block may be selected based on a program-erase (PE) count. The PE count of the target memory block may be N (N is a natural number). Cold data stored in the target memory block may be migrated to a memory block of which the program-erase count is M (M>N). In other words, since data with a low access frequency is migrated to a memory block having a high PE count, the wear level of memory blocks may be relatively uniformly maintained.

Figure 6A:
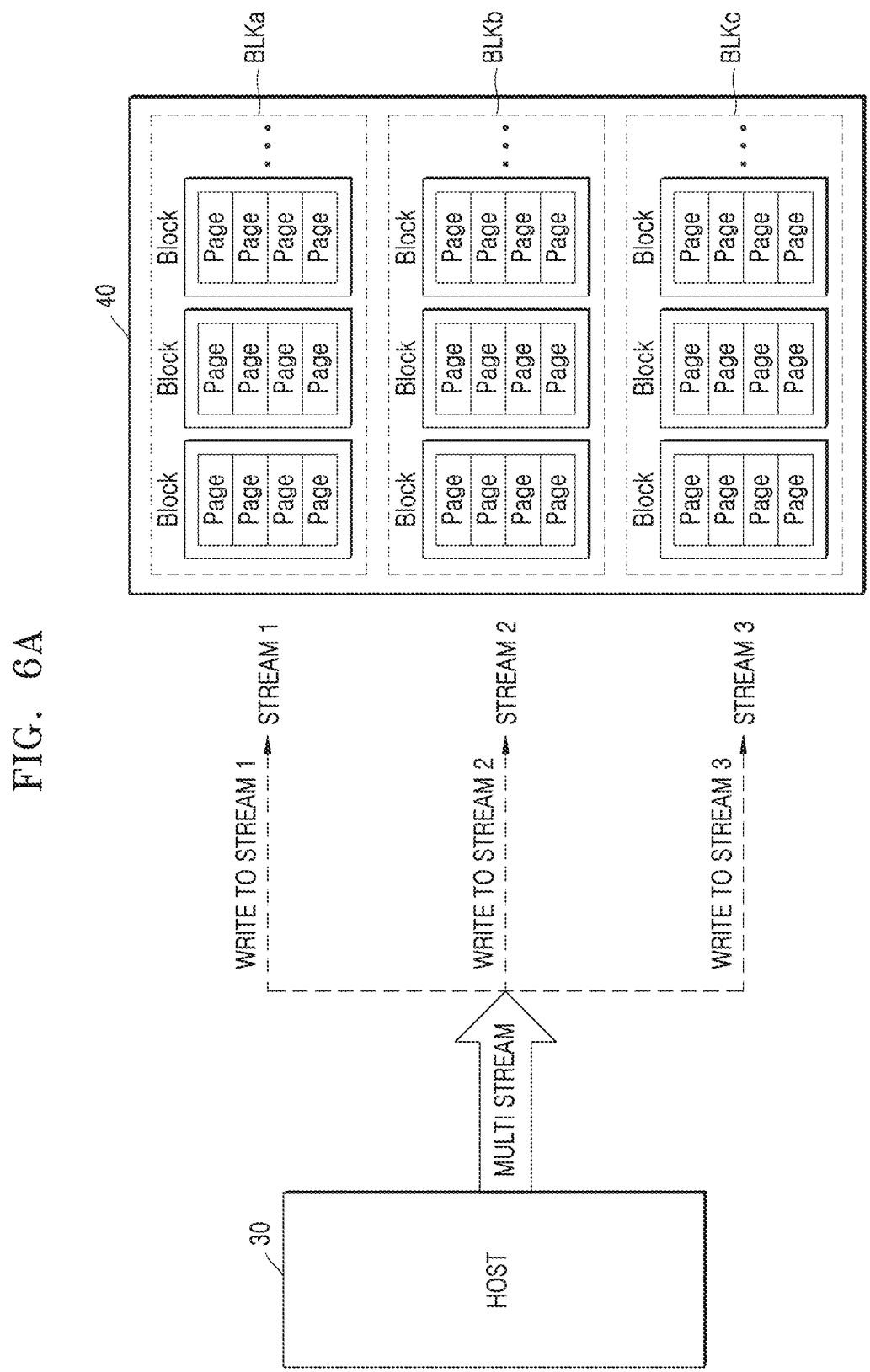
FIGS. 6A to 6C are diagrams schematically showing a multi-stream write operation according to example embodiments of the inventive concepts.
Figure 6B:
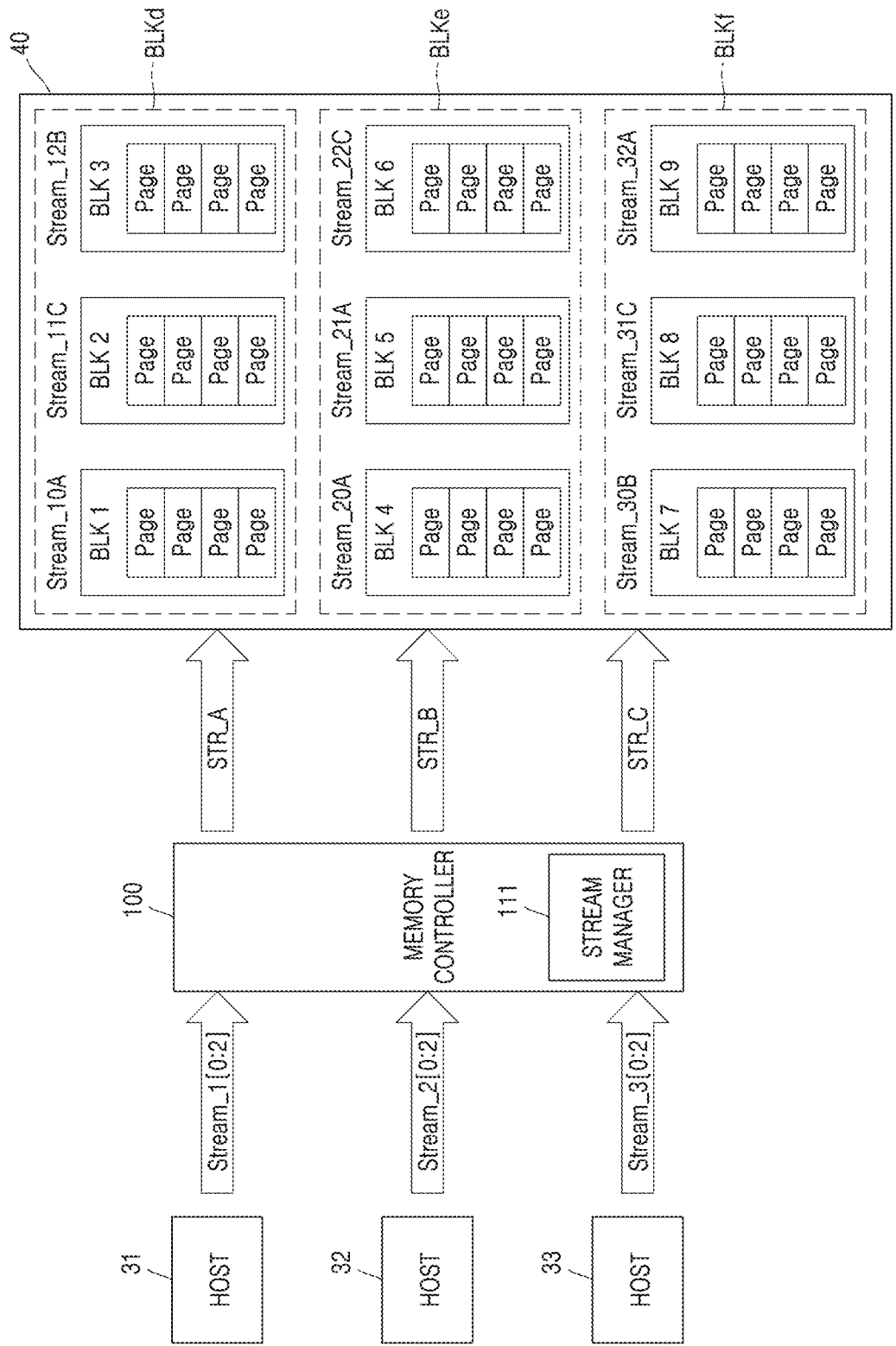
Figure 6C:
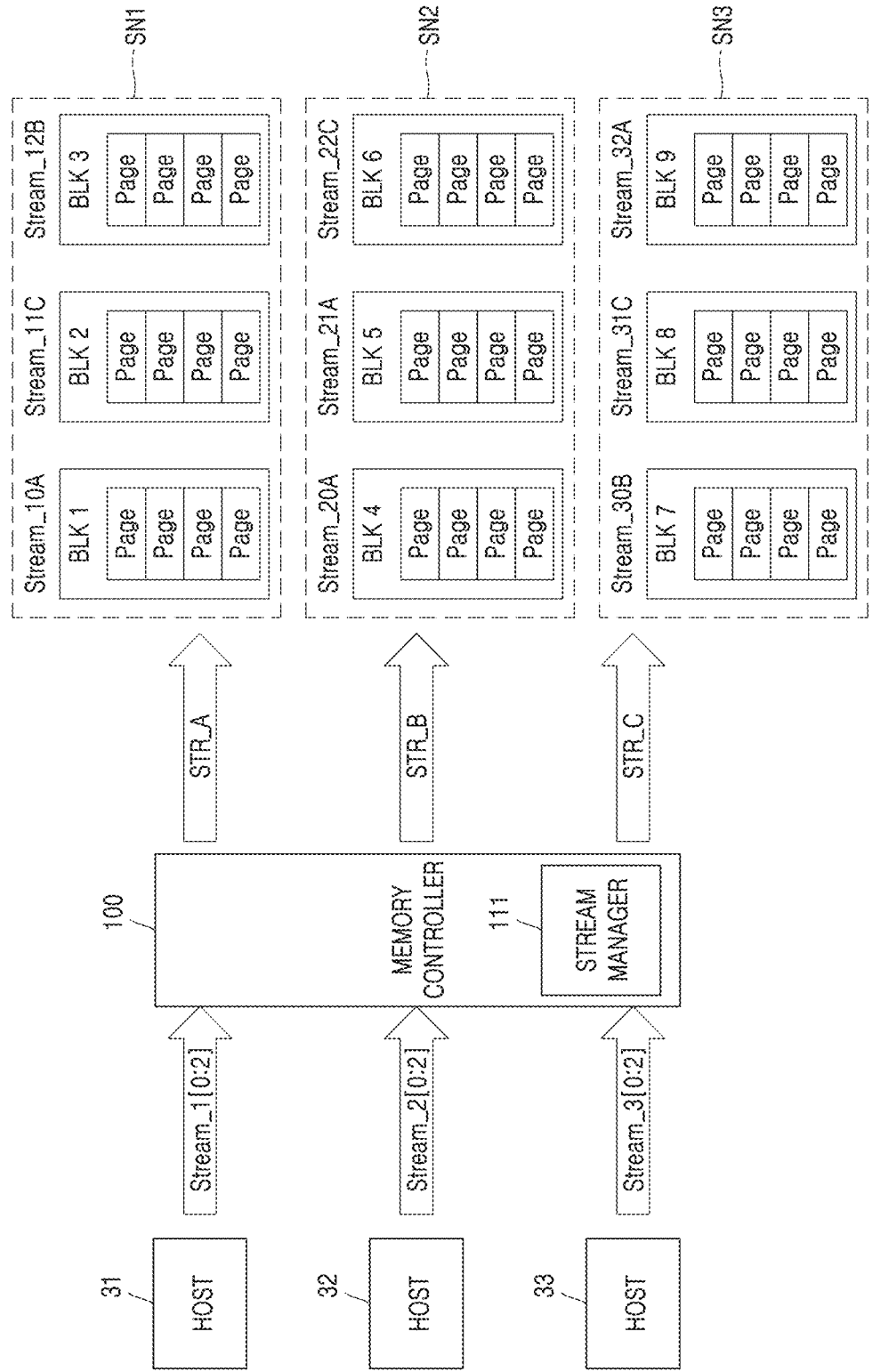

FIGS. 6A to 6C are diagrams schematically showing a multi-stream write operation according to example embodiments of the inventive concepts.

Referring to FIG. 6A, a host 30 may provide multi-stream data to a storage device 40. In some example embodiments, the host 30 may generate multi-stream data by allocating data having the same or substantially the same expected lifetime or similar expected lifetimes to the same stream and allocating data having different expected lifetimes to different streams. In some example embodiments, the storage device 40 may store data allocated to the same stream in a memory block corresponding to the corresponding stream and data allocated to different streams are distinguished and stored in different memory blocks corresponding to the corresponding streams.

For example, multi-stream data may include stream data corresponding to a first stream, stream data corresponding to a second stream, and stream data corresponding to a third stream. The storage device 40 may store stream data corresponding to the first stream in first blocks BLKa corresponding to the first stream, store stream data corresponding to the second stream in second blocks BLKb corresponding to the second stream, and store stream data corresponding to the third stream in third blocks BLKc corresponding to the third stream.

Referring to FIG. 6B, first to third hosts 31 to 33 may each provide stream data to the memory controller 100. For example, a first host 31 may provide stream data Stream_1[0:2] to the memory controller 100, a second host 32 may provide stream data Stream_2[0:2] to the memory controller 100, and a third host 33 may provide stream data Stream_3[0:2] to the memory controller 100. In this specification, stream data generated by a host may be expressed as Stream_XY. Here, X may be a host identifier for identifying a host, and Y may be a first stream identifier allocated by the host. For example, stream data Stream_10 may be expressed by a host identifier '1' of the first host 31 and a first stream identifier '0' allocated by the first host 31. Also, stream data having a plurality of first stream identifiers may be referred to as multi-stream data. For example, the multi-stream data Stream_1[0:2] may represent stream data having first stream identifiers '0', '1', and '2' allocated by the first host 31. The first to third hosts 31 to 33 may each generate stream data according to a unique policy and may allocate a first stream identifier to the stream data.

The memory controller 100 may allocate a second stream identifier other than first stream identifiers allocated by the first to third hosts 31 to 33 to the stream data based on the attribute of the stream data. For example, the memory controller 100 may generate A stream data STR_A, B stream data STR_B, and C stream data STR_C by allocating identifiers A to C to stream data. In this specification, stream data generated by the memory controller 100 may be expressed as Stream_XYZ. Here, X may be a host identifier for identifying a host, Y may be a first stream identifier allocated by the host, and Z may be a second stream identifier allocated by the memory controller 100. For example, stream data Stream_10A may be expressed by a host identifier '1' of the first host 31, a first stream identifier '0' allocated by the first host 31, and a second stream identifier 'A' allocated by the memory controller 100. Stream data having the second stream identifier 'A' may be referred to as A stream data STR_A.

For example, the stream manager 111 may group stream data Stream_1[0:2], Stream_2[0:2], and Stream_3[0:2] received from the first to third hosts 31 to 33 based on the attributes of the stream data Stream_1[0:2], Stream_2[0:2], and Stream_3[0:2] into subgroups and allocate an identifier (e.g., A, B, or C) to stream data belonging to the same subgroup. For example, referring to FIG. 6B, the A stream data STR_A may include stream data Stream_10 received from the first host 31, stream data Stream 21 received from the second host 32, and stream data Stream_32 received from the third host 33. The A stream data STR_A may be stream data belonging to the same subgroup and may have similar stream attributes.

The memory controller 100 may store stream data based on a host identifier and a first stream identifier. For example, the memory controller 100 may control the storage device 40 to store the stream data Stream_1[0:2] received from the first host 31 in fourth blocks BLKd, control the storage device 40 to store the stream data Stream_2[0:2] received from the second host 32 in fifth blocks BLKe, and control the storage device 40 to store stream data Stream_3[0:2] received from the third host 33 in sixth blocks BLKf. The storage device 40 may store a stream in memory block corresponding to the stream based on a stream identifier. For example, the storage device 40 may store the stream data Stream_1[0:2] received from the first host 31 in the fourth blocks BLKd, store the stream data Stream_2[0:2] received from the second host 32 in the fifth blocks BLKe, and store the stream data Stream_3[0:2] received from the third host 33 in the sixth blocks BLKf.

When a management operation on one of fourth to sixth blocks BLKd, BLKe, and BLKf is performed, the memory controller 100 may perform a management operation on another block determined based on a subgroup. For example, when a management operation is performed on a block storing the stream data Stream_10_A from among the fourth blocks BLKd, the memory controller 100 may perform a management operation on a block storing another stream data (e.g., Stream_20_A) belonging to the same subgroup as the stream data Stream_10_A. In other words, the memory controller 100 may preemptively perform management operations on blocks storing the A stream data STR_A.

According to example embodiments of the inventive concepts, the memory controller 100 may extend the lifetime of a storage device and reduce or prevent performance degradation by preemptively performing management operations on blocks storing stream data having similar attributes.

Referring to FIG. 6C, the memory controller 100 may store data in storage nodes corresponding to respective stream data. For example, the memory controller 100 may store the stream data Stream_1[0:2] received from the first host 31 in a first storage node SN1, store the stream data Stream_2[0:2] received from the second host 32 in a second storage node SN2, and store the stream data Stream_3[0:2] received from the third host 33 in a third storage node SN3. A storage node may refer to one physical device or a logical device including a plurality of storage regions distributed over a plurality of physical devices. For example, a plurality of blocks included in the first storage node SN1 shown in FIG. 6C may be included in one physical device. Alternatively, the blocks included in the first storage node SN1 may be distributed over a plurality of physical devices. The memory controller 100 may be an example of the memory controller 100 of FIG. 1, and the stream manager 111 may be an example of the stream manager 111 of FIG. 1. The number of multi-streams or the number of storage nodes is not limited thereto.

In FIG. 6C, as described above, the stream manager 111 may generate a subgroup based on attributes of stream data received from the first to third hosts 31 to 33. When a management operation on one of first to third storage nodes SN1 to SN3 is performed, the memory controller 100 may perform a management operation on another block determined based on a subgroup. For example, when a management operation is performed on a block BLK 1, which stores the stream data Stream_10A and is included in the first storage node SN1, the memory controller 100 may perform management operations on blocks BLK 4, BLK 5, and BLK 9 storing other stream data Stream_20A, Stream_21A, and Stream_32A belonging to the same subgroup as the Stream_10A. In other words, the memory controller 100 may perform management operations on blocks storing the A stream data STR_A. The memory controller 100 may extend the lifetime of storage nodes and reduce or prevent performance degradation by preemptively performing management operations on blocks storing stream data having similar attributes.

Figure 7:
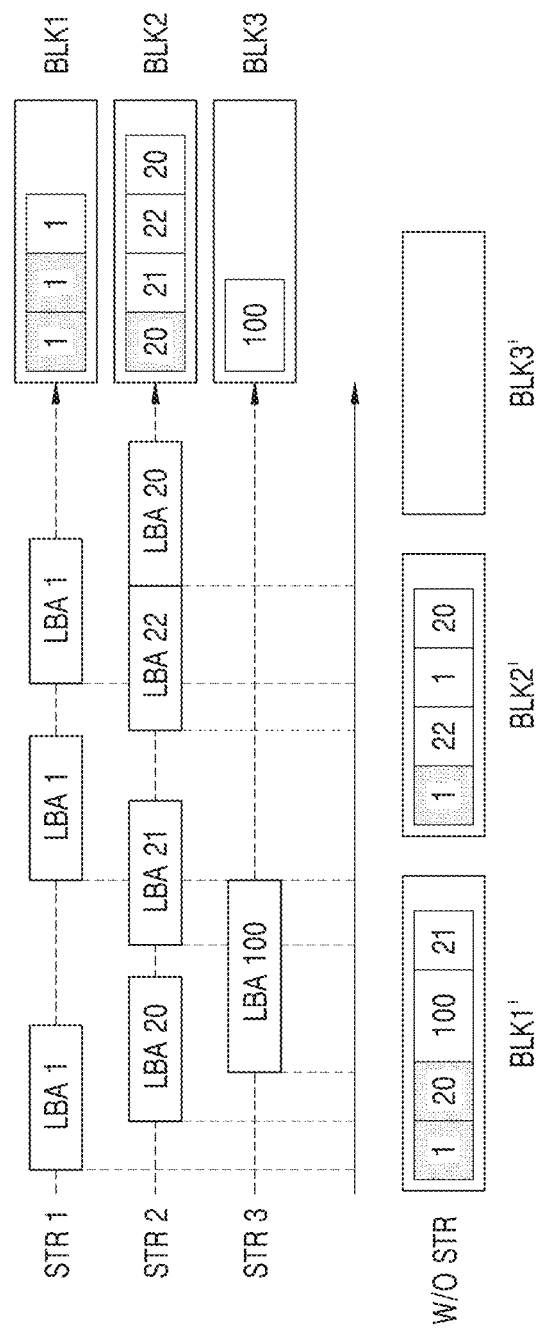
FIG. 7 is a diagram for describing a general write operation and a multi-stream write operation.

FIG. 7 is a diagram for describing a general or normal write operation and a multi-stream write operation. For example, the lower portion of FIG. 7 may show memory blocks BLK1' to 3' in which streams are stored during a general or normal write operation, and the right portion of FIG. 7 may show memory blocks BLK1 to 3 in which streams are stored during a multi-stream write operation.

Referring to the lower portion of FIG. 7, according to a general or normal write operation performed without a stream (W/O STR), a data write operation may be performed in response to a write command that does not include a stream identifier. Accordingly, a memory block in which data is stored may be determined according to an input order of data. For example, sequentially input data corresponding to logical block addresses (LBAs) LBA1, LBA20, LBA100, and LBA21 may be stored in a first memory block BLK1', and sequentially input data corresponding to LBAs LBA1, LBA22, LBA1, and LBA20 may be stored in a second memory block BLK2'.

Referring to the right portion of FIG. 7, in a multi-stream write operation, a data write operation may be performed in response to a write stream command including stream identifiers. Therefore, data may be stored in different memory blocks according to respective stream identifiers. Therefore, blocks in which multi-stream data is stored may vary according to stream identifiers, not an input order of data.

For example, a logical block address of all stream data corresponding to a first stream STR 1 may be LBA1, logical block addresses of stream data corresponding to a second stream STR 2 may sequentially be LBA20, LBA21, LBA22, and LBA20, and a logical block address of stream data corresponding to a third stream STR 3 may be LBA100.

For example, the stream identifier of the first stream STR 1 may be 1, and the first stream STR 1 may be stored in a first memory block BLK1. Also, the stream identifier of the second stream STR 2 may be 2, and the second stream STR 2 may be stored in a second memory block BLK2. Also, the stream identifier of the third stream STR 3 may be 3, and the third stream STR 3 may be stored in a third memory block BLK3.

First to third streams STR 1 to STR 3 may be stream data output by different hosts, respectively. For example, referring to FIG. 6B, the first stream STR 1 may be the stream data Stream_1[0:2] output by the first host 31, the second stream STR 2 may be the stream data Stream 2[0:2] output by the second host 32, and the third stream STR 3 may be the stream data Stream 3[0:2] output by the third host 33.

Figures 8, 9:
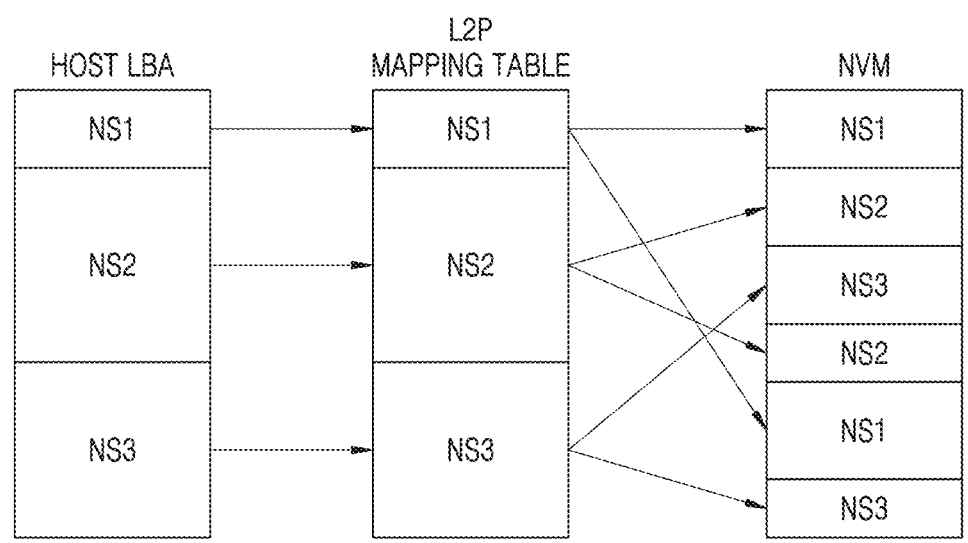
FIG. 8 is a diagram for describing a subgroup table according to example embodiments of the inventive concepts.
FIG. 9 is a diagram showing a logical-to-physical (L2P) mapping operation of a storage device supporting a multi-namespace function according to example embodiments of the inventive concepts.

FIG. 8 is a diagram for describing a subgroup table according to example embodiments of the inventive concepts. FIG. 8 may be described below with reference to FIGS. 1, 4, and 6B.

The memory controller 100 may allocate a second stream identifier (e.g., A, B, or C) to each of stream data Stream_1[0:2], Stream_2[0:2], and Stream_3[0:2] received from the first to third hosts 31 to 33 and store stream data to which the second stream identifier is allocated in the memory device 210.

For example, the stream manager 111 may generate a subgroup table 300 based on attributes of the stream data Stream_1[0:2], Stream_2[0:2], and Stream_3[0:2]. For example, the stream manager 111 may generate the subgroup table 300 based on an access frequency to a stream, a time until a stream is invalidated after being written to the memory device 210 (e.g., the lifetime of the stream), continuity of a logical addresses allocated to a stream, or a first stream identifier. For example, when the access frequency of the stream data STR_10 of the first host 31 and the access frequency of the stream data STR_20 of the second host 32 are the same, a first subgroup table sub group table 1 including the stream data STR_10 and the stream data STR_20 may be generated. The stream manager 111 may allocate a second stream identifier 'A' to stream data included in the first subgroup table sub group table 1.

In other words, the stream manager 111 may group streams received from the first to third hosts 31 to 33 based on attributes of the streams, and management operations on streams included in one group may be scheduled.

For example, referring to FIG. 6B, during a garbage collection operation, the memory controller 100 may select the first memory block BLK1 in which the stream data Stream_10A is stored as a target memory block based on the number of valid pages. The memory controller 100 according to example embodiments of the inventive concepts may refer to the subgroup table 300 and perform a garbage collection operation on stream data Stream_20A, Stream_21A, and Stream_32A included in the same subgroup table as the stream data Stream_10A. For example, the memory controller 100 may perform a garbage collection operation on fourth, fifth, and ninth blocks BLK4, BLK5, and BLK9. The performance of the storage device 40 may be improved by scheduling a management operation on stream data having the same second stream identifier.

FIG. 9 is a diagram showing an L2P mapping operation of a storage device supporting a multi-namespace function according to example embodiments of the inventive concepts.

Referring to FIG. 9, three namespaces, that is, first to third namespaces NS1 to NS3 may be generated in a storage device (e.g., 20 of FIG. 1). For example, logical address spaces of the first to third namespaces NS1 to NS3 may be mapped to physical address spaces thereof, respectively. Therefore, the total logical address space provided by the first to third namespaces NS1 to NS3 may be smaller than or equal to the physical address space of a non-volatile memory NVM. Referring to FIG. 6C, in some example embodiments, the non-volatile memory NVM may correspond to at least one of the first to third storage nodes SN1 to SN3.

Some address spaces (e.g., LBA0 to LBA3) from among the entire logical address spaces may be allocated to a first namespace NS1, some address spaces (e.g., LBA4 to LBA7) subsequent to the address spaces allocated to the first namespace NS1 from among the entire logical address spaces may be allocated to a second namespace NS2, and some address spaces (e.g., LBA8 to LBA11) subsequent to the address spaces allocated to the second namespace NS2 from among the entire logical address spaces may be allocated to a third namespace NS3. Therefore, logical address spaces managed by an L2P mapping table for the first to third namespaces NS1 to NS3 coincide with physical address spaces of the non-volatile memory NVM.

Figure 10:
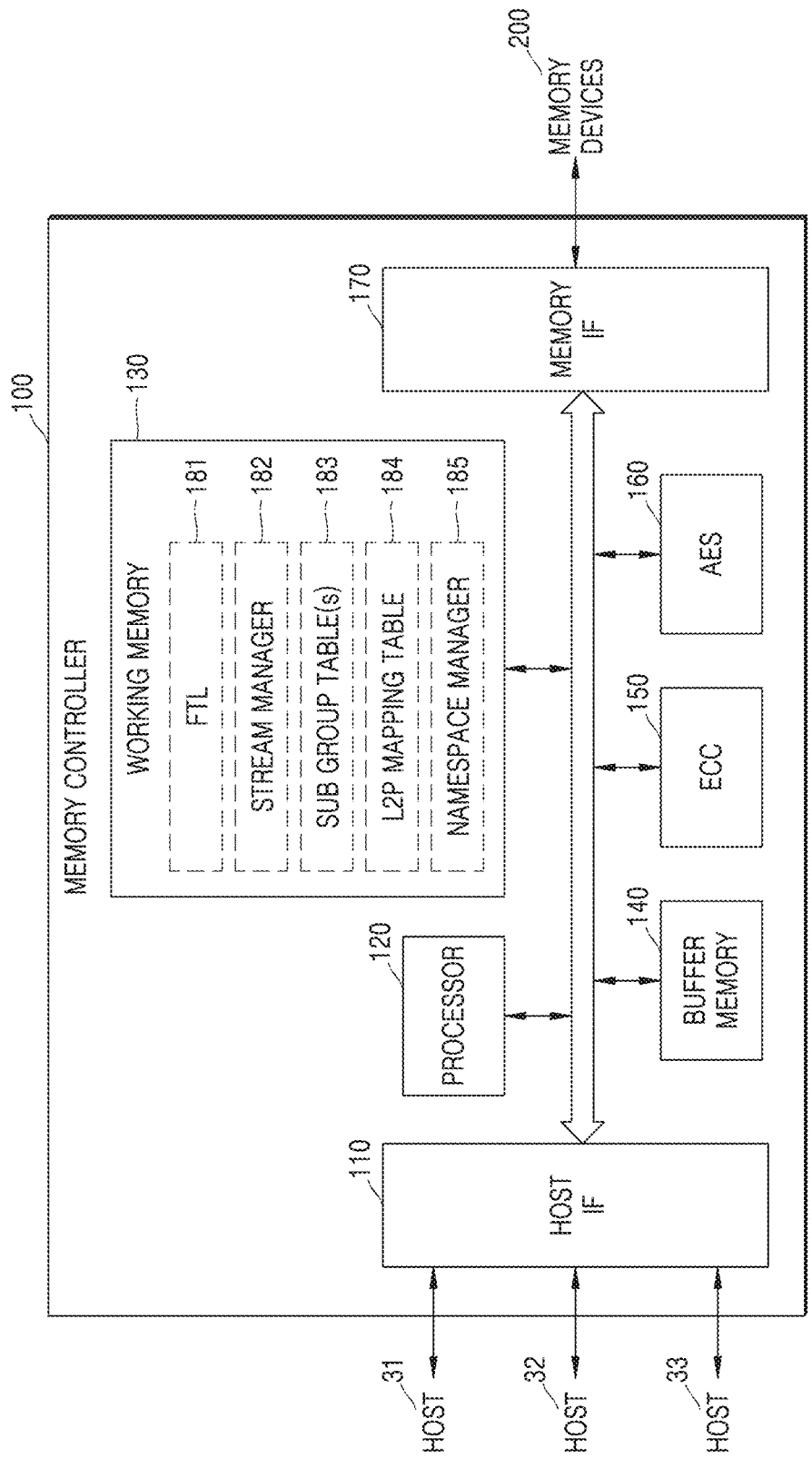
FIG. 10 is a block diagram showing a memory controller according to example embodiments of the inventive concepts.

FIG. 10 is a block diagram showing a memory controller according to example embodiments of the inventive concepts.

The memory controller 100 may receive data from the first to third hosts 31 to 33 or transmit data to the first to third hosts 31 to 33.

The memory controller 100 may include a host interface 110, a memory interface 170, and/or a processor 120. Also, the memory controller 100 may further include a working memory 130, a buffer memory 140, an error correction code (ECC) engine 150, and/or an advanced encryption standard (AES) engine 160.

A flash translation layer (FTL) 181, a stream manager 182, at least one subgroup table 183, an L2P mapping table 184, and/or a namespace manager 185 may be loaded to the working memory 130. The processor 120 may execute the FTL 181, and a data writing operation and a data reading operations for the memory device 210 may be controlled by the FTL 181.

The FTL 181 may perform various functions like address mapping, operating voltage adjustment, garbage collection, and wear-leveling. In the present specification, operating voltage adjustment, garbage collection, or wear-leveling may be referred to as a management operation. The address mapping operation is an operation for translating a logical address received from a host into a physical address used to actually store data in the memory device 210. As described above with reference to FIG. 3, the operating voltage adjustment may be a technique of adjusting a voltage level of an operating voltage used during an internal operation (e.g., a program operation, a read operation, or an erase operation) in the non-volatile memory 131. The garbage collection is, as described above with reference to FIG. 5A, a technique of securing usable capacity in the memory device 210 by copying valid data of a block to a new block and erasing the existing block. The wear-leveling is a technique for reducing or preventing excessive deterioration of a particular block by making blocks in the memory device 210 to be uniformly used as described above with reference to FIG. 5B and may be, for example, implemented through a firmware technique for balancing erase counts of physical blocks.

The ECC engine 150 may detect and correct an error on read data read from the memory device 210. For example, the ECC engine 150 may generate parity bits regarding program data to be programmed to the memory device 210, and such parity bits may be stored in the memory device 210 together with the program data. When data is read from the memory device 210, the ECC engine 150 may correct an error of read data using parity bits read from the memory device 210 together with the read data and output error-corrected read data.

The AES engine 160 may perform at least one of an encryption operation and a decryption operation for data input to the memory controller 100 using, for example, a symmetric-key algorithm.

The stream manager 182 may group a plurality of streams received from the first to third hosts 31 to 33 into a plurality of subgroups based on attributes of the streams. An attribute of a stream may be an access frequency to the stream, a time until the stream is invalidated after being written to the memory device 210 (e.g., the lifetime of the stream), continuity of a logical addresses allocated to the stream, or a stream identifier. The stream manager 182 may generate at least one subgroup table 183 by using streams having similar attributes. The FTL 181 may refer to the subgroup table 183 and perform a management operation on storage regions of the memory device 210 in which streams included in the same subgroup table 183 are stored.

The namespace manager 185 may dynamically generate or erase namespaces as shown in FIG. 9 in response to namespace generation requests or namespace erase requests received from the first to third hosts 31 to 33. The L2P mapping table 184 may be updated to reflect generated or erased namespaces.

The memory interface 170 may transmit a plurality of streams to the memory devices 200 or receive the plurality of streams from the memory devices 200.

Figure 11:
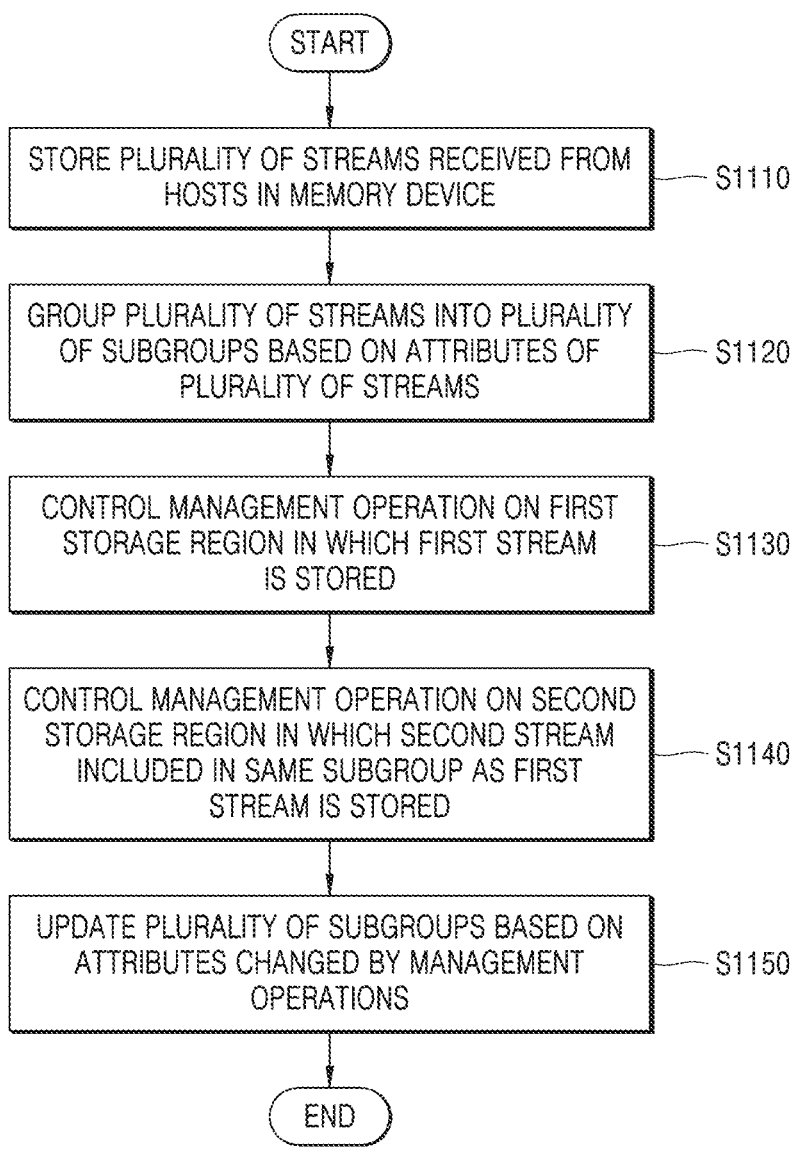
FIG. 11 is a flowchart of a method of operating a memory controller according to example embodiments of the inventive concepts.

FIG. 11 is a flowchart of a method of operating a memory controller according to example embodiments of the inventive concepts. FIG. 11 may be described below with reference to FIG. 10. The method of operating the memory controller 100 may include a plurality of operations S1110 to S1150.

In operation S1110, the memory controller 100 may store a plurality of streams received from the first to third hosts 31 to 33 in the memory device 210. Different stream identifiers may be allocated to the streams. In some example embodiments, the memory controller 100 may store the streams in namespaces received from the first to third hosts 31 to 33. Different streams received from the first to third hosts 31 to 33 may be stored in the same namespace or may be stored in different namespaces.

In operation S1120, the memory controller 100 may group the streams into a plurality of subgroups based on attributes of the streams. For example, the memory controller 100 may monitor attributes of the streams stored in the memory device 210 and generate a subgroup table 133 by using streams having similar attributes. Streams included in one subgroup table 133 may be streams received from the same host or streams received from different hosts. For example, as described above with reference to FIG. 8, the memory controller 100 may count access frequencies of the streams by the first to third hosts 31 to 33 and generate a subgroup table by using streams having similar access frequencies. For example, the memory controller 100 may count a time until a stream is invalidated after the stream is written to the memory device 210 (e.g., the lifetime of the stream) and generate a subgroup table by using streams having similar lifetimes. For example, the memory controller 100 may generate a subgroup table by using streams to which consecutive logical addresses are allocated. For example, the memory controller 100 may generate a subgroup table by using streams to which consecutive stream identifiers are allocated.

In operation S1130, the memory controller 100 may control a management operation on a first storage region in which a first stream is stored. The first storage region may be a memory block. For example, when a read operation with respect to the first stream fails, the memory controller 100 may control an operation of adjusting a read voltage for the first storage region in which the first stream is stored. For example, the memory controller 100 may control a garbage collection operation on the first storage region based on the number of valid pages included in the first storage region. For example, the memory controller 100 may control a wear leveling operation on the first storage region based on a PE count of the first storage region.

In operation S1140, the memory controller 100 may control a management operation on a second storage region in which a second stream included in the same subgroup as the first stream is stored. In some example embodiments, the second storage region may be a physical block corresponding to a namespace different from that of the first storage region. In some example embodiments, the first stream and the second stream may be streams received from different hosts. The memory controller 100 may obtain an address of the second storage region in which the second stream is stored by referring to a subgroup table and may control a management operation on the second storage region based on an obtained address. In some example embodiments, operation S1140 may be performed as a background operation. In other words, operation S1140 may be performed during a time period in which a channel between the memory controller 100 and the memory device 210 is in an idle state.

In operation S1150, the memory controller 100 may update a plurality of subgroups based on attributes or addresses of streams changed by management operations. When a management operation is performed, attributes including the access frequency to a stream and the lifetime of the stream may be changed. Also, when a management operation is performed, the address of a storage region in which a stream is stored may be changed. Therefore, the memory controller 100 may newly generate a subgroup table for a plurality of streams immediately after a management operation is performed or at every predetermined or alternatively, desired period.

According to a method of operating a memory controller according to example embodiments of the inventive concepts, the lifespan of a storage region storing streams having similar attributes may be increased by performing a management operation on streams included in one subgroup.

Figure 12:
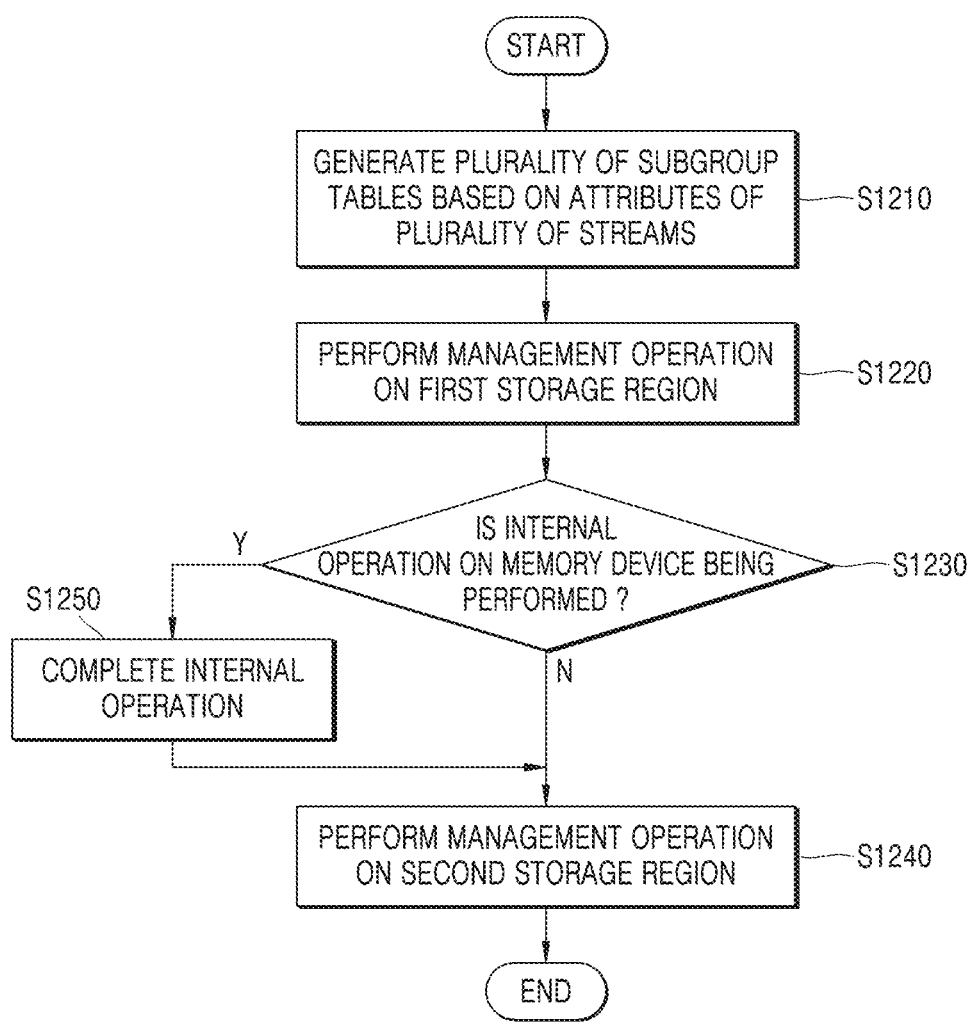
FIG. 12 is a flowchart of an operating method of a memory controller according to example embodiments of the inventive concepts.

FIG. 12 is a flowchart of a method of operating a memory controller according to example embodiments of the inventive concepts. Referring to FIG. 12, the method of operating a memory controller may include a plurality of operations S1210 to S1250. FIG. 12 may be described below with reference to FIGS. 3 and 10.

In operation S1210, the memory controller 100 may generate a plurality of subgroup tables based on the attributes of the streams. Since operation S1210 may correspond to operation S1120 of FIG. 11, detailed descriptions thereof may be omitted.

In operation S1220, the memory controller 100 may perform a management operation on a first storage region. The first storage region may be a storage region in which a first stream is stored. In some example embodiments, a storage region may refer to a block. Since operation S1120 may correspond to operation S1130 of FIG. 11, detailed descriptions thereof may be omitted.

In operation S1230, the memory controller 100 may determine whether an internal operation for the non-volatile memory 131 is being performed. The non-volatile memory 131 may be a non-volatile memory including a second storage region. Although not shown in FIG. 3, the non-volatile memory 131 may be connected to the memory controller 100 through a control signal channel for exchanging a chip enable (CE) signal, a write enable (WE) signal, and/or a read enable (RE) signal. The memory controller 100 may determine whether an internal operation for the non-volatile memory 131 is being performed by monitoring the control signal channel. The internal operation may be a program operation, a read operation, or an erase operation. When an internal operation for the non-volatile memory 131 is not being performed, operation S1240 may be performed. When an internal operation on the non-volatile memory 131 is being performed, operation S1250 may be performed.

In operation S1240, the memory controller 100 may perform a management operation on a second storage region. The second storage region may be a storage region in which a second stream is stored. The second stream may be a stream included in the same subgroup table as the first stream. In other words, the memory controller 100 may perform a management operation on the second storage region during a time period in which an internal operation is not performed in the non-volatile memory 131.

In operation S1250, the memory controller 100 may complete an internal operation being performed in the non-volatile memory 131. The memory controller 100 may manage a schedule between the internal operation of the memory device 131 and the management operation on the second storage region by performing operation S1240 after completing the internal operation.

Figure 13:
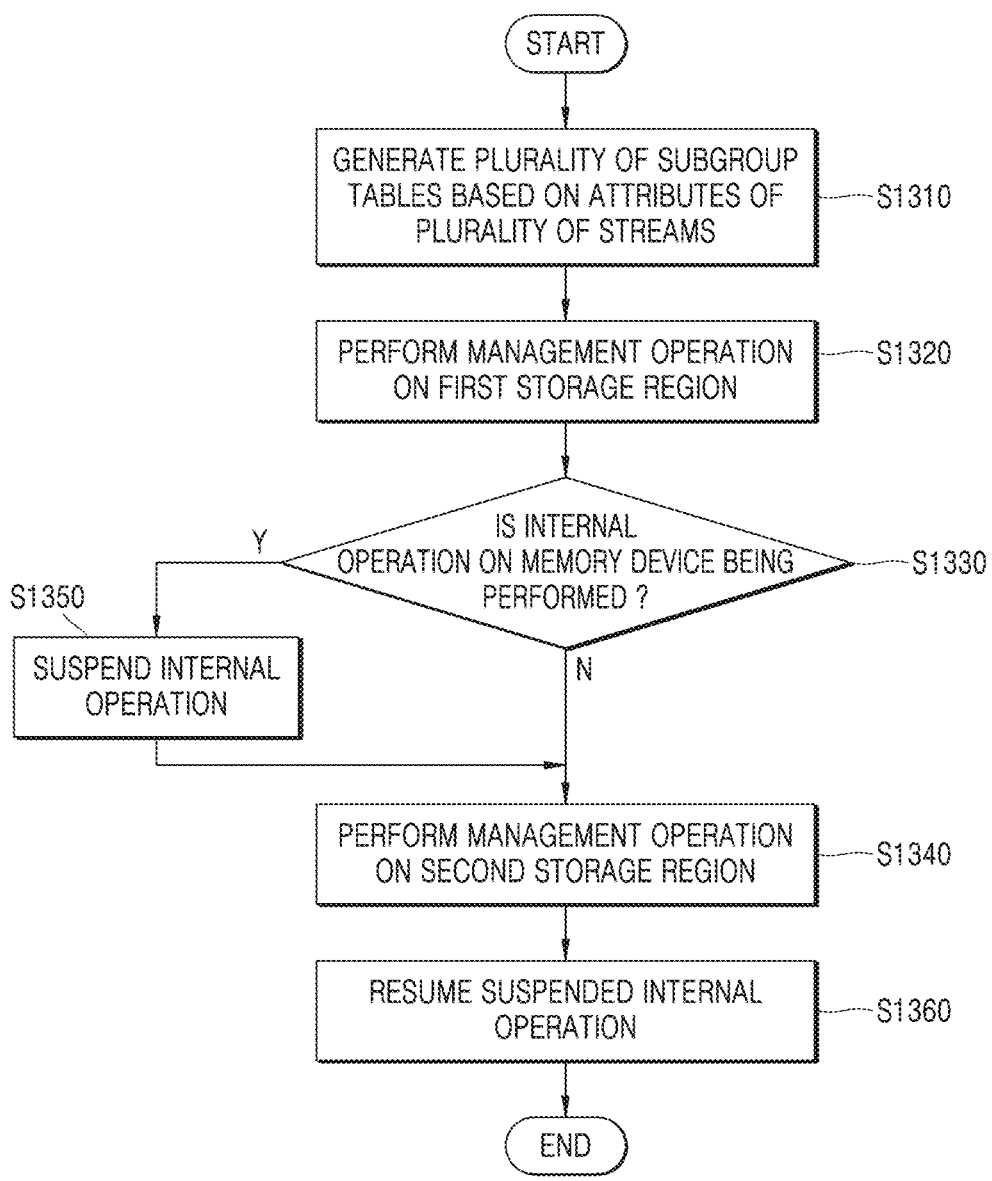
FIG. 13 is a flowchart of an operating method of a memory controller according to example embodiments of the inventive concepts.

FIG. 13 is a flowchart of a method of operating a memory controller according to example embodiments of the inventive concepts. Referring to FIG. 13, the method of operating a memory controller may include a plurality of operations S1310 to S1360. FIG. 13 may be described below with reference to FIGS. 3 and 10. Operations S1310 to S1330 may correspond to operations S1210 to S1230 of FIG. 12, respectively. Therefore, detailed descriptions thereof may be omitted.

In operation S1330, when an internal operation on the memory device 131 is not being performed, operation S1340 may be performed. When an internal operation on the non-volatile memory 131 is being performed, operation S1350 may be performed.

In operation S1340, the memory controller 100 may perform a management operation on a second storage region. The second storage region may be a storage region in which a second stream is stored. The second stream may be a stream included in the same subgroup table as the first stream. In other words, the memory controller 100 may perform a management operation on the second storage region during a time period in which an internal operation is not performed in the non-volatile memory 131.

In operation S1350, the memory controller 100 may suspend an internal operation being performed in the non-volatile memory 131. When the internal operation is suspended, the state of the non-volatile memory 131 at the time of the suspension may be stored. For example, an operating voltage level at the time of suspension, the number of program loops performed until the time of suspension, or the number of erase loops performed until the time of suspension may be stored. In some example embodiments, in operation S1350, the memory controller 100 may abort an internal operation being performed in the non-volatile memory 131. When the internal operation is aborted, the internal operation performed until being suspended may be initialized.

In operation S1360, the memory controller 100 may continue the suspended internal operation. For example, the memory controller 100 may resume the internal operation based on the state of the non-volatile memory 131 at the time of suspension. In some example embodiments, in operation S1350, the memory controller 100 may newly perform the aborted internal operation. For example, the memory controller 100 may re-perform the aborted internal operation based on data stored in the buffer memory 140 shown in FIG. 10 or a command (a program command, a read command, or an erase command) stored in a command queue (not shown).

After the internal operation is suspended, the memory controller 100 may perform operation S1240 and then resume the suspended internal operation, thereby managing a schedule between the internal operation of the memory device 131 and a management operation on the second storage region.

Figure 14:
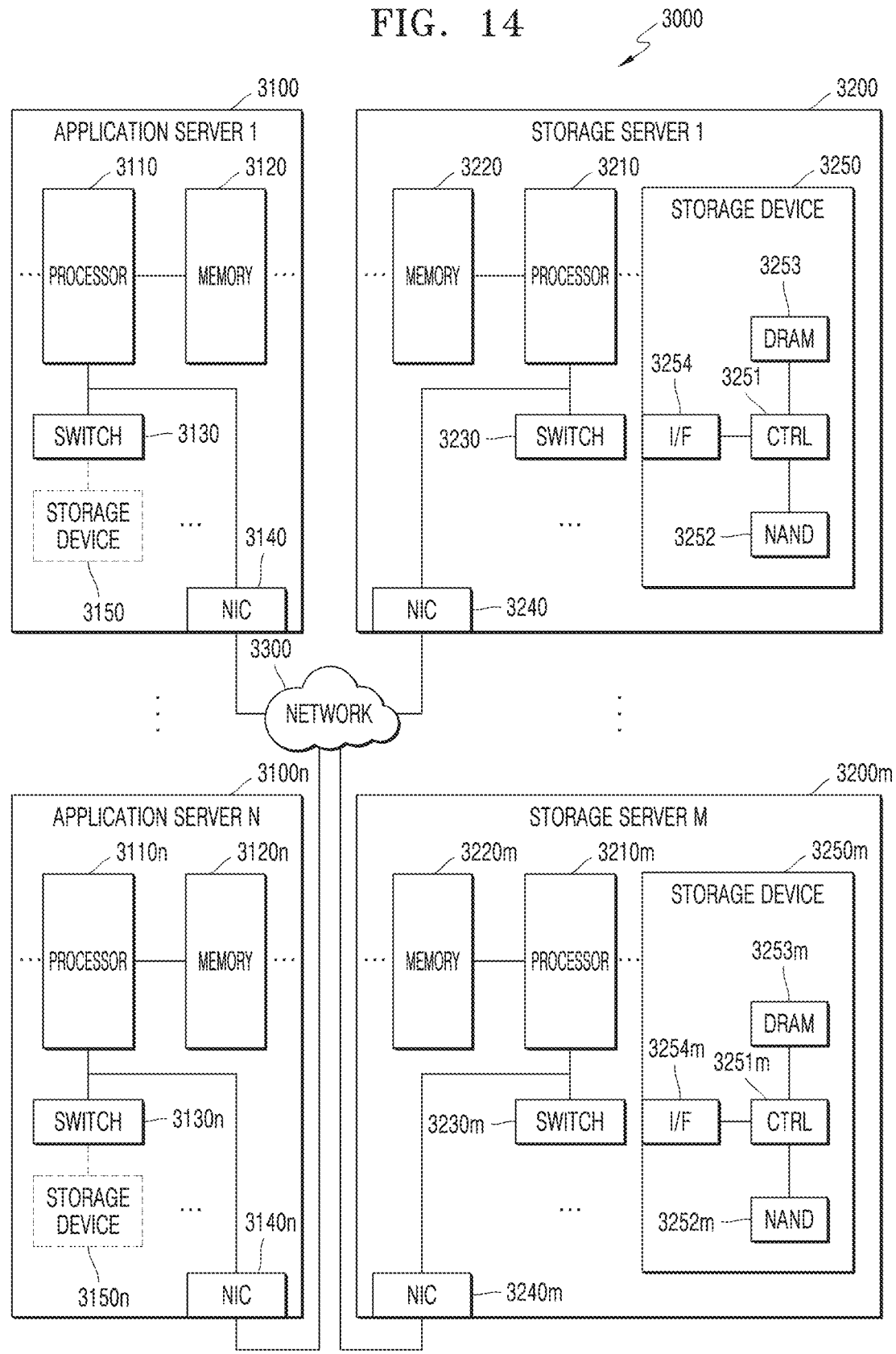
FIG. 14 is a diagram showing a data center including a storage device according to example embodiments of the inventive concepts.

FIG. 14 is a diagram showing a data center to which a storage device according to example embodiments of the inventive concepts is applied.

Referring to FIG. 14, a data center 3000 is a facility that collects various types of data and provides services and may also be referred to as a data storage center. The data center 3000 may be a system for operating a search engine and a database and may also be a computing system used by a company like a bank or a government agency. The data center 3000 may include application servers 3100 to 3100n and storage servers 3200 to 3200m. The number of application servers 3100 to 3100n and the number of storage servers 3200 to 3200m may be variously selected according to example embodiments, and the number of application servers 3100 to 3100n may be different from the number of storage servers 3200 to 3200m.

The application server 3100 or the storage server 3200 may include at least one of processors 3110 and 3210 and memories 3120 and 3220. In example embodiments of a storage server 3200, a processor 3210 may control the overall operation of the storage server 3200 and access a memory 3220 to execute instructions and/or data loaded into the memory 3220. The memory 3220 may be a double data rate synchronous DRAM (DDR SDRAM), a high bandwidth memory (HBM), a hybrid memory cube (HMC), a dual in-line memory module (DIMM), an optane DIMM, or a non-volatile DIMM (NVMDIMM). According to example embodiments, the number of processors 3210 and the number of memories 3220 included in the storage server 3200 may be variously selected. In some example embodiments, the processor 3210 and the memory 3220 may provide a processor-memory pair. In some example embodiments, the number of processors 3210 and the number of memories 3220 may be different from each other. The processor 3210 may include a single core processor or a multiple core processor. The above description of the storage server 3200 may be similarly applied to an application server 3100. According to example embodiments, the application server 3100 may not include a storage device 3150. The storage server 3200 may include at least one or more storage devices 3250. The number of the storage devices 3250 included in the storage server 3200 may be variously selected according to example embodiments.

The application servers 3100 to 3100n according to example embodiments of the inventive concepts may correspond to the host 10 of FIG. 1 or the first to third hosts 31 to 33 of FIGS. 6B and 8. In other words, the application servers 3100 to 3100n may each transmit streams having stream identifiers to the storage server 3200 through a network 3300. The application servers 3100 to 3100n and the storage servers 3200 to 3200m may communicate with each other through the network 3300. Hereinafter, descriptions will mainly focus on the application server 3100 and the storage server 3200. Descriptions of the application server 3100 may be applied to other application servers 3100n, and descriptions of the storage server 3200 may also be applied to other storage servers 3200m.

The application server 3100 may store data requested to be stored by a user or a client in one of the storage servers 3200 to 3200m through the network 3300. Also, the application server 3100 may obtain data requested to be read by a user or a client from one of the storage servers 3200 to 3200m through the network 3300. For example, the application server 3100 may be implemented as a web server or a database management system (DBMS).

In example embodiments of the storage server 3200, an interface 3254 may provide a physical connection between the processor 3210 and a controller 3251 and a physical connection between a network interface card (NIC) 3240 and the controller 3251. For example, the interface 3254 may be implemented as a direct attached storage in which a storage device 3250 is directly accessed through a dedicated cable. Also, for example, the interface 3254 may be implemented as one of various interface protocols like advanced technology attachment (ATA), serial ATA (ATA), external SATA (e-SATA), small computer small interface (SCSI), aerial attached SCSI (SAS), peripheral component interconnection (PCI), PCI express (PCIe), NVM express (NVMe), IEEE 1394, universal serial bus (USB), a secure digital (SD) card, a multi-media card (MMC), an embedded multi-media card (eMMC), universal flash storage (UFS), an embedded universal flash storage (eUFS), a compact flash (CF) card interface, an NVMe over Fabric (NVMeoF), and a network protocol supporting RDMA.

The storage server 3200 may further include a switch 3230 and the NIC 3240. The switch 3230 may selectively connect the processor 3210 to the storage device 3250 or selectively connect the NIC 3240 to the storage device 3250 under the control of the processor 3210.

In the storage servers 3200 to 3200m or the application server 3100 to 3100n, processors may program or read data by transmitting commands to storage devices 3130 to 3130n and 3250 to 3250m or memories 3120 to 3120n and 3220 to 3220m. In some example embodiments, the data may be data that is error-corrected through an error correction code (ECC) engine. The data is data processed through data bus inversion (DBI) or data masking (DM) and may include cyclic redundancy code (CRC) information. The data may be data encrypted for security or privacy.

The storage devices 3150 to 3150m and 3250 to 3250m may transmit control signals and commands/address signals to NAND flash memory devices 3252 to 3252m in response to a read command received from a processor. The storage devices 3150 to 3150m and 3250 to 3250m may correspond to the storage device 20 of FIG. 1. Therefore, in example embodiments of reading out data from the NAND flash memory devices 3252 to 3252m, a read enable (RE) signal may be input as a data output control signal and may output data to a DQ bus. A data strobe (DQS) may be generated by using the RE signal. A command and an address signal may be latched in a page buffer according to a rising edge or a falling edge of a write enable (WE) signal.

The controller 3251 may control the overall operation of the storage device 3250. In some example embodiments, the controller 3251 may include a static random access memory (SRAM). The controller 3251 may write data to a NAND flash 3252 in response to a write command or may read data from the NAND flash 3252 in response to a read command. For example, a write command and/or a read command may be provided from the processor 3210 in the storage server 3200, a processor 3210m in another storage server 3200m, or processors 3110 and 3110n in application servers 3100 and 3100n. A DRAM 3253 may temporarily store (buffer) data to be written to the NAND flash 3252 or data read from the NAND flash 3252. Also, the DRAM 3253 may store meta-data. Here, meta-data is user data or data generated by the controller 3251 to manage the NAND flash 3252. The storage device 3250 may include a secure element (SE) for security or privacy.

The controller 3251 according to example embodiments of the inventive concepts may correspond to the memory controller 100 of FIG. 1 or the memory controller 100 of FIG. 10. Therefore, the controller 3251 may group streams received from the application servers 3100 to 3100n into a plurality of subgroups based on attributes of the streams. As described above with reference to FIGS. 12 and 13, the controller 3251 may improve the lifetime of the storage device 3250 by scheduling a management operation on streams included in subgroups.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An operating method of a storage device comprising a memory controller and a memory device, the method comprising:
storing a plurality of streams received from a plurality of hosts in the memory device; and
performing an operation on the memory device,
the operation comprising
performing a management operation on a first storage region from among storage regions of the memory device in which a first stream from among the plurality of streams is stored,
selecting a second stream from among the plurality of streams based on an attribute of the first stream, and
preemptively performing the management operation on a second storage region from among the storage regions of the memory device in which the second stream is stored, after the selecting the second stream,
wherein the first stream and the second stream are different respective streams, and
the first stream and the second stream are received from different respective hosts from among the plurality of hosts.

2. The operating method of claim 1, wherein the management operation comprises a garbage collection operation performed on the storage regions of the memory device, a wear leveling operation performed on the storage regions of the memory device, or an operation for adjusting an operating voltage level used during an internal operation of the memory device.

3. The operating method of claim 1, wherein the attribute of the first stream is an access frequency with respect to the first stream, a time until the first stream is invalidated after being written to the memory device, a continuity of a logical address allocated to the first stream, or a first stream identifier.

4. The operating method of claim 1, wherein the selecting the second stream comprises selecting a stream from among the plurality of streams having an attribute identical or consecutive to the attribute of the first stream as the second stream.

5. The operating method of claim 1, wherein the preemptively performing of the management operation on the second storage region is performed during an idle time in which data is not received from the plurality of hosts.

6. The operating method of claim 1, wherein the preemptively performing of the management operation on the second storage region further comprises:
detecting whether an internal operation is being performed on the memory device; and performing the management operation on the second storage region after the internal operation that is detected is completed.

7. The operating method of claim 1, wherein the preemptively performing of the management operation on the second storage region further comprises:
detecting whether an internal operation is being performed on the memory device;
suspending the internal operation that is detected;
performing the management operation on the second storage region; and
resuming the internal operation that is suspended on the memory device.

8. The operating method of claim 1, wherein the storing of the plurality of streams in the memory device comprises:
storing the first stream received from a first host from among the plurality of hosts in the first storage region; and
storing the second stream received from a second host from among the plurality of hosts in the second storage region.

9. The operating method of claim 1, wherein the first storage region is a storage region corresponding to continuous logical address spaces having a first size, and
the second storage region is a storage region corresponding to consecutive logical address spaces having a second size.

10. The operating method of claim 1, further comprising:
generating subgroup tables by grouping the plurality of streams based on attributes of the plurality of streams,
wherein the first stream and the second stream are included in a same subgroup table from among the subgroup tables.

11. An operating method of a memory controller, the operating method comprising:
storing a plurality of streams received from a first host and a second host in a first storage node and a second storage node, respectively;
grouping the plurality of streams into a plurality of subgroups based on attributes of the plurality of streams;
controlling a management operation on a first storage region of the first storage node in which a first stream from among the plurality of streams is stored;
selecting a second stream included in a same subgroup from among the plurality of subgroups as the first stream; and
preemptively controlling a management operation on a second storage region of the second storage node in which the second stream included in the same subgroup is stored, after the selecting the second stream,
wherein the first stream and the second stream are different respective streams, and
wherein the first stream is received from the first host, and the second stream is received from the second host.

12. The operating method of claim 11, wherein the grouping of the plurality of streams into the plurality of subgroups comprises:
monitoring the attributes of the plurality of streams stored in the first storage node and the second storage node; and
generating a plurality of subgroup tables corresponding to the plurality of subgroups, respectively based on the attributes of the plurality of streams.

13. The operating method of claim 12, further comprising updating the plurality of subgroup tables based on the attributes of the plurality of streams changed by the management operation on the first storage region and the management operation on the second storage region.

14. A storage device comprising:
a memory device comprising storage regions including a first storage region and a second storage region; and
a memory controller configured to store a plurality of streams received from a plurality of hosts in the memory device, control the memory device to perform a management operation on the first storage region in which a first stream from among the plurality of streams is stored, select a second stream from among the plurality of streams based on an attribute of the first stream, and after the second stream is selected, control the memory device to preemptively perform a management operation on the second storage region in which the second stream is stored,
wherein the first stream and the second stream are different respective streams, and
the first stream and the second stream are received from different respective hosts from among the plurality of hosts.

15. The storage device of claim 14, wherein the management operation comprises a garbage collection operation performed on the storage regions of the memory device, a wear leveling operation performed on the storage regions of the memory device, or an operation for adjusting an operating voltage level used during an internal operation of the memory device.

16. The storage device of claim 14, wherein the attribute of the first stream is an access frequency with respect to the first stream, a time until the first stream is invalidated after being written to the memory device, a continuity of a logical address allocated to the first stream, or a first stream identifier.

17. The storage device of claim 16, wherein the memory controller is further configured to select a stream from among the plurality of streams having an attribute identical or consecutive to the attribute of the first stream as the second stream.

18. The storage device of claim 14, wherein the memory controller is further configured to detect whether an internal operation is being performed on the memory device and preemptively perform the management operation on the second storage region after the internal operation that is detected is completed.

19. The storage device of claim 14, wherein the memory controller is further configured to detect whether an internal operation is being performed on the memory device, suspend the internal operation that is detected, preemptively perform the management operation on the second storage region, and resume the internal operation that is suspended on the memory device.

* * * * *